US009377111B2

(12) United States Patent
De Muinck et al.

(10) Patent No.: US 9,377,111 B2
(45) Date of Patent: Jun. 28, 2016

(54) BUTTERFLY VALVE

(75) Inventors: Ebo Jacques De Muinck, Loenen Aan de Vecht (NL); Jaap Jeroen Sondaar, Woerdense Verlaat (NL)

(73) Assignee: Scholle IPN Corporation, Northlake, IL (US)

( * ) Notice: Subject to any disclaimer, the term of this patent is extended or adjusted under 35 U.S.C. 154(b) by 1389 days.

(21) Appl. No.: 12/298,842

(22) PCT Filed: Apr. 28, 2006

(86) PCT No.: PCT/NL2006/050104
§ 371 (c)(1),
(2), (4) Date: May 20, 2009

(87) PCT Pub. No.: WO2007/126305
PCT Pub. Date: Nov. 8, 2007

(65) Prior Publication Data
US 2010/0044373 A1 Feb. 25, 2010

(51) Int. Cl.
*B65D 49/00* (2006.01)
*F16K 1/226* (2006.01)

(52) U.S. Cl.
CPC ......... *F16K 1/2261* (2013.01); *Y10T 29/49945* (2015.01)

(58) Field of Classification Search
CPC .. F16K 1/2261; B65D 77/068; B65D 77/067; B65D 77/065; B65D 77/062
USPC ................ 220/86.1, 495.06, 495.08, 495.01, 220/495.05, 23.86, 23.83, 723, 601; 251/305, 306; 383/120, 66
See application file for complete search history.

(56) References Cited

U.S. PATENT DOCUMENTS 3,521,857 A * 7/1970 Over .............................. 251/305
4,003,394 A * 1/1977 Adams ........................ 137/15.06
(Continued)

FOREIGN PATENT DOCUMENTS

CN 1662762 A 8/2005
DE 8301963 7/1983
(Continued)

OTHER PUBLICATIONS

International Search Report of the European Patent Office Patent Office in counterpart foreign application No. PCT/NL2006/050104 filed Apr. 28, 2006.
(Continued)

*Primary Examiner* — Anthony Stashick
*Assistant Examiner* — Robert Poon
(74) *Attorney, Agent, or Firm* — The Watson I.P. Group, PLC; Jovan N. Jovanovic; Vladan M. Vasiljevic

(57) ABSTRACT

The invention relates to a butterfly valve, comprising a passageway, a valve seat enclosing the passageway, a rotatable valve shaft which has an axis of rotation spaced from a plane through the valve seat, a valve plate member fixed to the valve shaft and being located in the passageway, and seal enclosing the valve plate member. The valve plate member has an open position and a closed position. At least in a plane through the seal in the open position, the width of the passageway adjacent to the valve seat as viewed from the valve seat in the direction of the axis of rotation is larger than the width of the passageway at the valve seat. Due to this configuration leakage via the seal in the closed position is avoided, because of minimal deformation of the seal in the open position. The butterfly valve has good resistance against irradiation and high-temperature necessary for enabling disinfection of the butterfly valve and a container to which it can be fixed and which is suitable for storage of sterilized products.

20 Claims, 8 Drawing Sheets

(56) References Cited

U.S. PATENT DOCUMENTS

| | | | | |
|---|---|---|---|---|
| 4,407,483 | A * | 10/1983 | Gachot | 251/287 |
| 4,618,994 | A * | 10/1986 | Bishop | 383/96 |
| 5,579,953 | A * | 12/1996 | Perkins | B65D 77/067 222/1 |
| 5,626,254 | A * | 5/1997 | Podd et al. | 220/1.6 |
| 6,032,818 | A * | 3/2000 | Olson | 220/495.06 |
| 6,131,767 | A * | 10/2000 | Savage | B67D 3/043 222/1 |
| 6,293,432 | B1 * | 9/2001 | Hartwall | 222/105 |
| 6,446,934 | B2 * | 9/2002 | Bonomi | 251/306 |
| 6,494,466 | B1 * | 12/2002 | Hartman et al. | 277/641 |
| 7,721,759 | B2 * | 5/2010 | Naidu et al. | 137/590 |
| 2001/0017362 | A1 * | 8/2001 | Schutz | 251/306 |
| 2005/0109314 | A1 * | 5/2005 | Suzuki et al. | 123/337 |
| 2005/0184105 | A1 * | 8/2005 | Johnson | B67D 7/005 222/568 |
| 2006/0180589 | A1 * | 8/2006 | De Muinck | 220/495.06 |
| 2009/0159594 | A1 * | 6/2009 | Nielsen | B67D 3/045 220/8 |

FOREIGN PATENT DOCUMENTS

| | | |
|---|---|---|
| EP | 1547967 | 12/2004 |
| GB | 689630 | 4/1953 |
| GB | 873117 | 7/1961 |
| GB | 960915 | 6/1964 |
| JP | 2005114140 | 4/2005 |
| RU | 2229432 | 1/2003 |
| RU | 52151 | 9/2005 |
| WO | WO 03/093704 | 11/2003 |
| WO | WO 2004/022440 | 3/2004 |

OTHER PUBLICATIONS

Submitted herewith is a Written Opinion of the European Patent Office Patent Office in counterpart foreign application No. PCT/NL2006/050104 filed Apr. 28, 2006.
Notification of the Third Office Action of People's Republic of China, application serial No. 200680054995.3, Date of Notification Mar. 12, 2012, filed Apr. 28, 2006, pp. 1-9.
Official Action of People's Republic of China, application serial No. 200680054995.3, filed Apr. 28, 2006, pp. 1-8.
Official Action of Russian Patent Office, application 2008147113.

* cited by examiner

BUTTERFLY VALVE

CROSS-REFERENCE TO RELATED APPLICATION

This application is a National Stage Filing of International Application PCT/NL2006/050104, filed Apr. 28, 2006 and published as WO 2007/126305 in English.

BACKGROUND

The discussion below is merely provided for general background information and is not intended to be used as an aid in determining the scope of the claimed subject matter.

Aspects of the present invention relate to a butterfly valve, comprising a housing including a passageway defined by an internal surface of the housing, said passageway having a center line in axial direction thereof, a valve seat enclosing the passageway, a valve shaft rotatably mounted to the housing and having an axis of rotation extending through the center line and spaced from a plane through the valve seat, a valve plate member fixed to the valve shaft and being located in the passageway, a seal enclosing the valve plate member, said valve plate member having an open position and a closed position, in which the seal is in engagement with the valve seat so as to close the passageway.

An earlier butterfly valve of the applicant was designed for filling and/or emptying containers for storage of liquid material, for example. This type of butterfly valve has a valve plate member, wherein the valve plate member is provided with a circular disc which is enclosed by a sealing ring. The valve shaft is eccentrically fixed to the disc and located at one side thereof. The passageway is closed by the sealing ring in the closed position. This configuration makes the valve suitable for use in storing sterilized liquids in the container as infections cannot penetrate from the outside into the liquid through narrow spaces between the valve shaft and the housing such as is the case in well-known butterfly valves having a valve shaft through the center of the disc. However, a disadvantage of the butterfly valve with an eccentrically positioned valve shaft is that it is sensible to leakage just after closing the butterfly valve as a consequence of temporary deformation of the seal near the valve shaft when the valve plate member is in the open position.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An aspect of a butterfly valve herein described has at least in a plane through the seal in the open position the width of the passageway adjacent to the valve seat as viewed from the valve seat in the direction of the axis of rotation is larger than the width of the passageway at the valve seat.

As the axis of rotation is located eccentrically with respect to the plane through the seal and intersects the center line of the passageway, in the open position a part of seal near the axis of rotation is positioned in a part of the passageway having a smaller width than the initial width of the seal in the closed position. Due to the features mentioned above the seal has more room now and is deformed less in the open position, hence reducing the risk of leakage just after closing the butterfly valve.

The cross-sectional area of the passageway has a circumferential edge, which circumferential edge adjacent to the valve seat as viewed from the valve seat in the direction of the axis of rotation of the valve shaft may extend beyond the circumferential edge at the valve seat in radial direction thereof. The advantage of this configuration is that it is easy to manufacture.

The cross-sectional area of the passageway, which may be circular, may gradually increase beyond the valve seat as viewed from the valve seat in the direction of the axis of rotation of the valve shaft. This avoids local pressure peaks on the seal in the open position which could arise due to a sudden transition of the cross-sectional area beyond the valve seat.

The cross-sectional area of the passageway at least at the valve seat may decrease in axial direction of the passageway as viewed from the axis of rotation to the valve seat. Furthermore, the cross-sectional area of the passageway may decrease up to an axial location of the passageway adjacent to an end portion of the valve plate member in its closed position, which end portion is located on the valve plate member in a direction as viewed from the axis of rotation to the seal. The advantage of this configuration is that the space between the housing and the valve plate member in its closed position is minimized, if the valve plate member has a decreasing cross sectional area in the direction as viewed from the axis of rotation to the plane through the seal so as to avoid contact between the circumferential edge of the valve plate member and the housing in the open position. In this case the seal is engaged more securely between the valve plate member and the housing in the closed position of the valve plate member. Furthermore, due to this configuration the seal may transfer forces on the valve plate member to the housing in axial direction, such that the valve shaft may be constructed less rigid.

The passageway comprises an inlet at one side and an outlet at an opposite side of the valve plate member. The valve plate member may be provided with reinforcement ribs located at a side of the valve plate member facing the outlet. The reinforcement ribs can be located next to the valve shaft as viewed from the plane through the seal in a direction perpendicular thereto. The reinforcement ribs serve to minimize deformation of the valve plate member in the closed position when an external force is exerted onto one of both sides of the valve plate member.

The butterfly valve may comprise a stop mechanism for stopping the valve plate member with respect to the housing when it is rotated from its open position to its closed position. Such a stop mechanism avoids that the valve plate member is rotated further than the closed position which would lead to opening the butterfly valve again.

The stop mechanism may comprise a projection mounted to the valve plate member which projects beyond the circumference of the valve plate member in a radial direction of the plane through the seal substantially perpendicular to the axis of rotation. The advantage of this feature is that it provides the opportunity to integrate the stop mechanism and the plate member.

Preferably, the housing is made of polycarbonate. The advantage of polycarbonate is that it is suitable for materials which have to be disinfected, because it has a high resistance against irradiation and high temperature. Resistance against disinfection methods may be required for a butterfly valve which is fixed to a storage container for storing sterilized products.

The valve plate member can be made of polyamide, and the valve shaft can be made of fibre-reinforced polyamide. The type of polyamide is, for example, polyamide 66. These materials have a high strength and are also resistant against irradiation and high temperature. It is also possible to make the valve plate member and/or the valve shaft of polycarbonate. Such as mentioned above polycarbonate has a high resistance against irradiation and high temperature. Moreover, polycarbonate is not as hydroscopic as polyamide which means that it swells less than polyamide in an aqueous environment, hence minimizing the risk of bad fit of the shaft and valve plate member in the housing.

The invention also relates to a container and valve assembly, wherein the valve and container are mounted to each other such that the container can be filled and/or emptied with liquid material by opening the valve. The valve comprises a butterfly valve such as described hereinbefore.

The container may comprise a foldable bag which is arranged such that it folds when it is emptied, and the bag is secured to the housing of the butterfly valve at a location thereof spaced from an end of the housing which protrudes in the bag. The assembly having this configuration can be used in a bag-in-box combination, wherein the foldable bag is placed in a box and which bag unfolds in the box during filling it. At the end of the filling process the bag has the shape of the box. When emptying the bag through the butterfly valve, which is typically located at a low level with respect to the box and which may be fixed to the box, any wall of the bag may stick to and slide downwardly along the wall of the back to which the butterfly valve is attached. Due to the protruding part of the butterfly valve the passageway will not stick to the bag wall part surrounding the valve and thereby close-off the valve.

The housing of the butterfly valve may comprise a flange located on an external surface portion thereof, and the external surface portion is fixed to a sleeve which is mounted to a hole of the container whereas the flange faces an external wall of the container. The sleeve may include a flange opposite to the flange of the housing, which flange of the housing has a circumferential edge extending at least partly beyond a circumferential edge of the flange of the sleeve as viewed from the center line. Due to these features the outer edge of the flange of the housing prevents the flange of the sleeve from exerting a too high force on the wall of the bag by its outer edge, such as the case with state-of-the-art bag and valve assemblies, which could lead to cutting a hole into the bag in the region where the outer edge of the flange contacts the bag. The cutting effect might occur when the butterfly valve is mounted to a bag which is placed near the bottom of a bag-in-box combination such that the flange of the sleeve, if this had a larger diameter than the flange of the housing, contacts the bottom. It may be clear that, since the bag wall is disposed between the flange of the sleeve and the bottom of the box, the flange of the sleeve may cut the bag during transport, for example.

The invention also relates to a method of securing a plastic valve and a flexible container, which valve comprises a cylindrical housing mating to a sleeve which is fixed to a mating hole in a wall of the container. The housing is pressed into the sleeve so as to fix the housing to the container. The advantage of this method is that it facilitates the manufacturing process.

BRIEF DESCRIPTION OF THE DRAWINGS

The invention and advantages thereof will now be explained in more detail with reference to the drawings.

DETAILED DESCRIPTION OF THE ILLUSTRATIVE EMBODIMENTS

Figure 1:
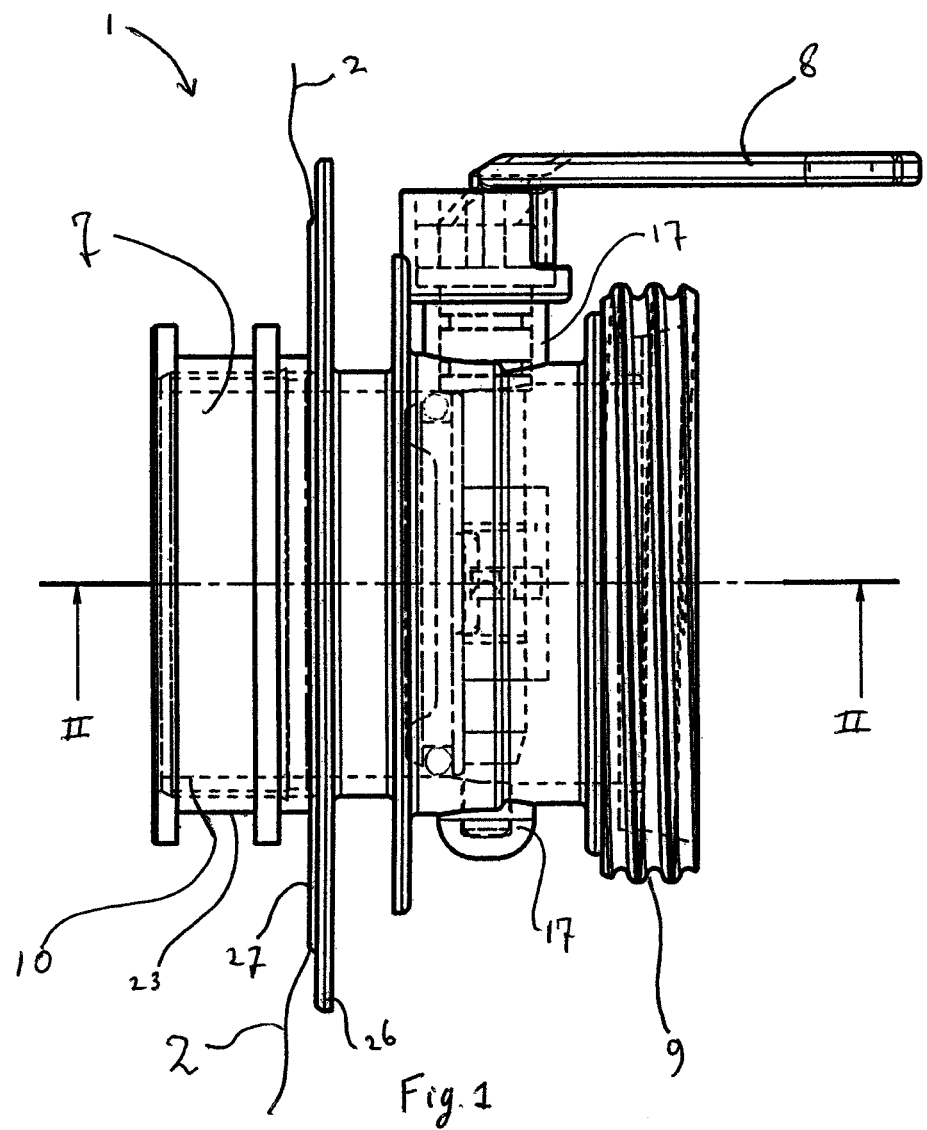
FIG. 1 is a schematic side view of an embodiment of a butterfly valve according to the invention illustrating a closed position of a valve plate member, and a part of a bag to which the butterfly valve is fixed.
Figure 2:
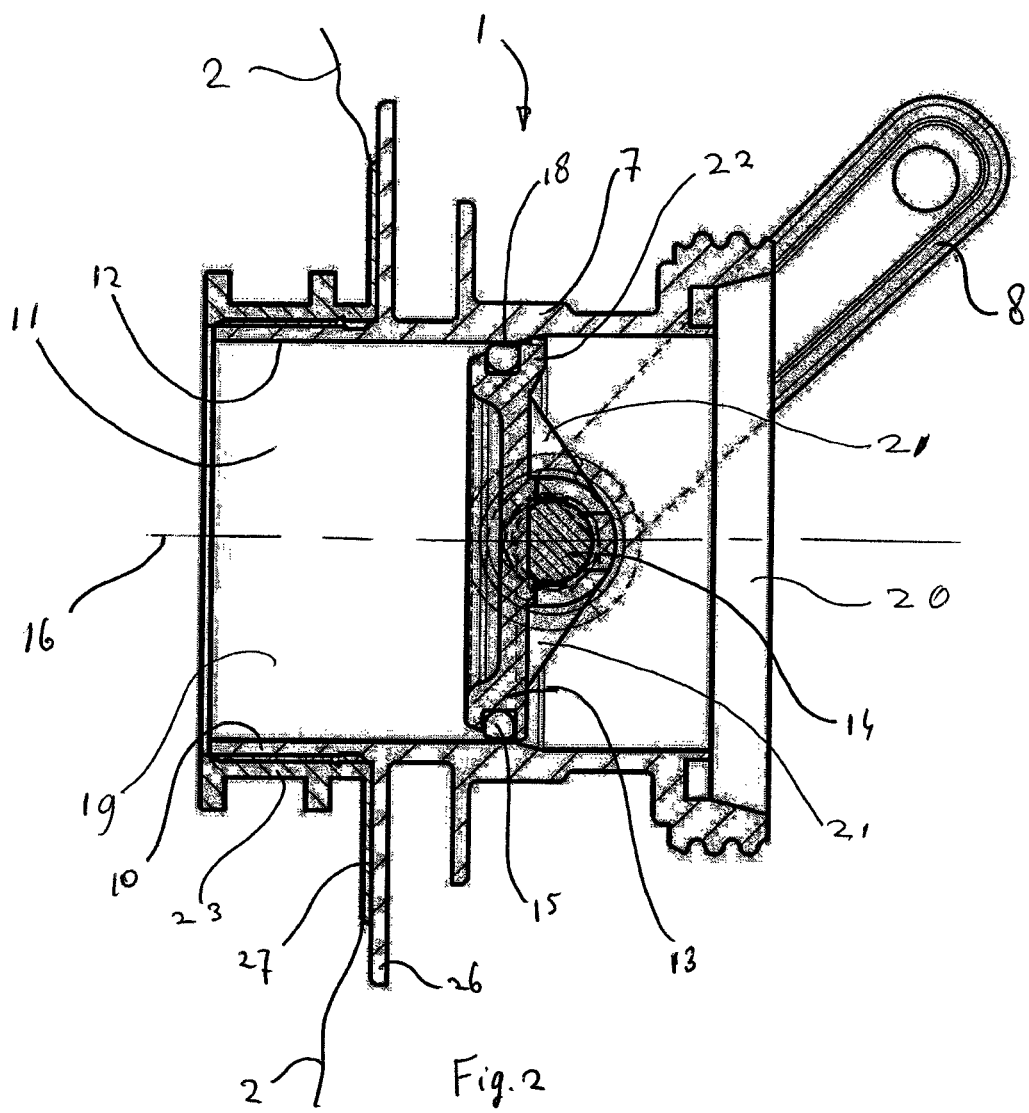
FIG. 2 is a sectional view along the line II-II in FIG. 1.
Figure 3:
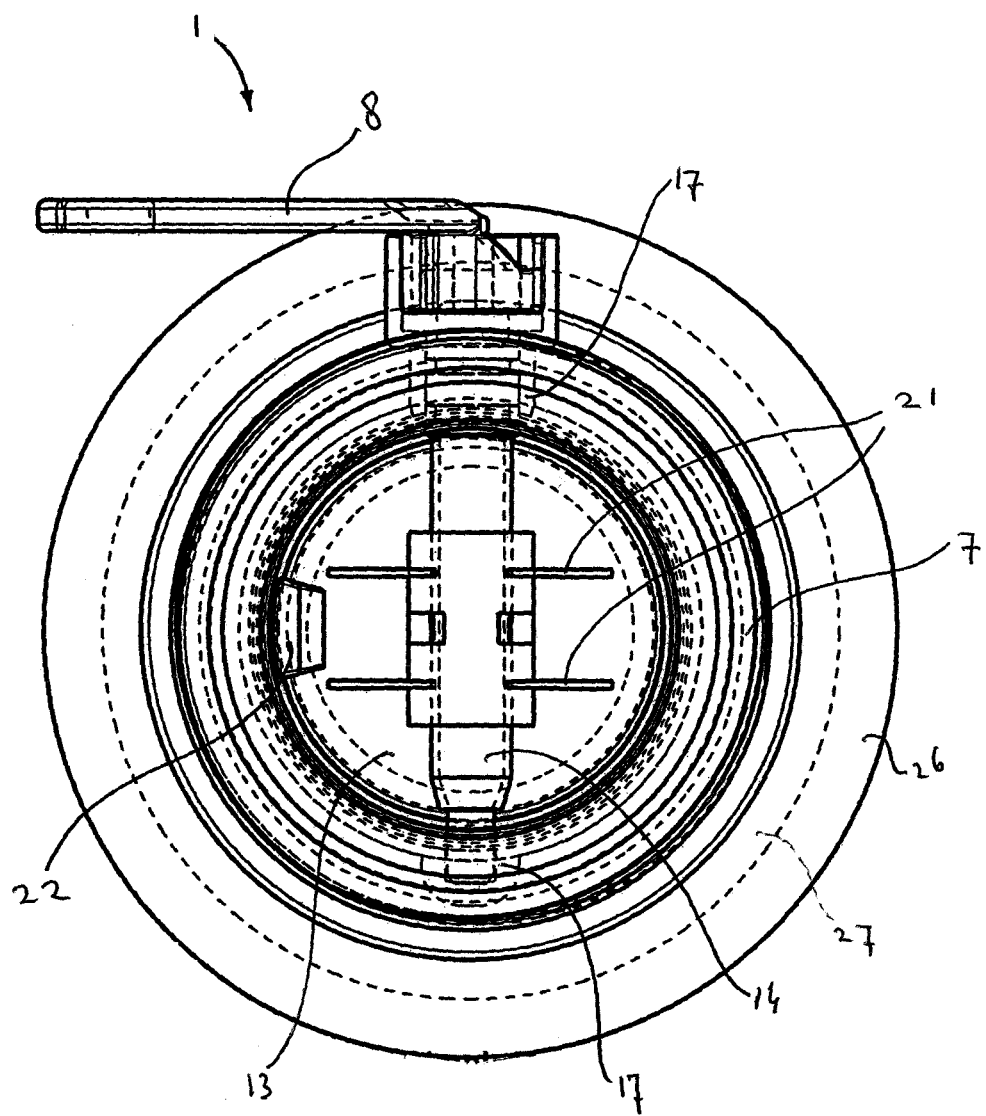
FIG. 3 is a front view of the butterfly valve of FIG. 1.
Figure 4:
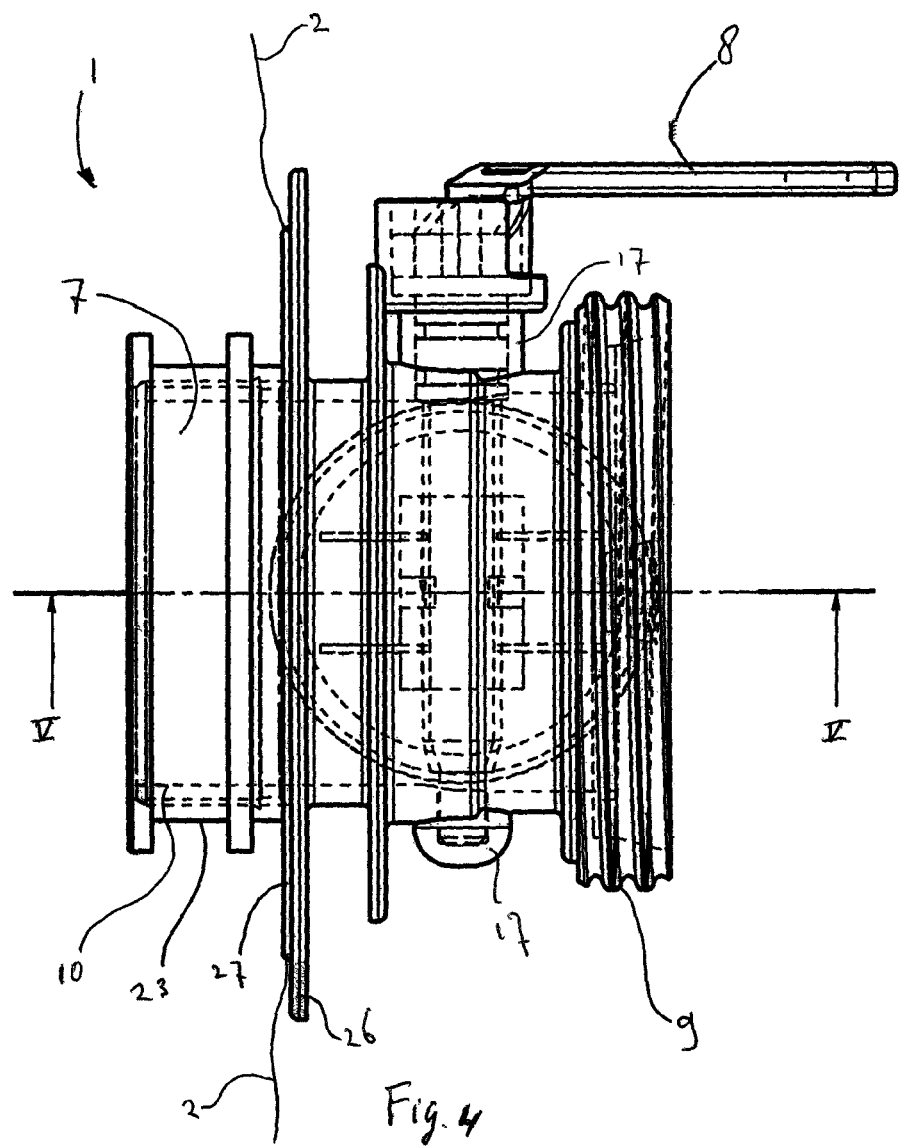
FIG. 4 is the butterfly valve of FIG. 1, illustrating an open position of the valve plate member.

FIGS. 1-6 show different views of an embodiment of a butterfly valve 1 according to the invention. In FIGS. 1-3 the valve 1 is shown in a closed condition and in FIGS. 4-6 the valve 1 is shown in an open condition.

Such a butterfly valve 1 is used, for example, in the field of containers for storage of sterilized liquids. The butterfly valve 1 is suitable to be fixed to a foldable bag 2 which is mounted in a box 3 such as shown in FIG. 8. Such a bag-in-box 4 including a foldable bag 2 is disclosed in the International Patent Application WO 2004/022440, see for example FIGS. 1-5 in this application. The contents of this application are incorporated herein by reference thereto.

Figure 8A:
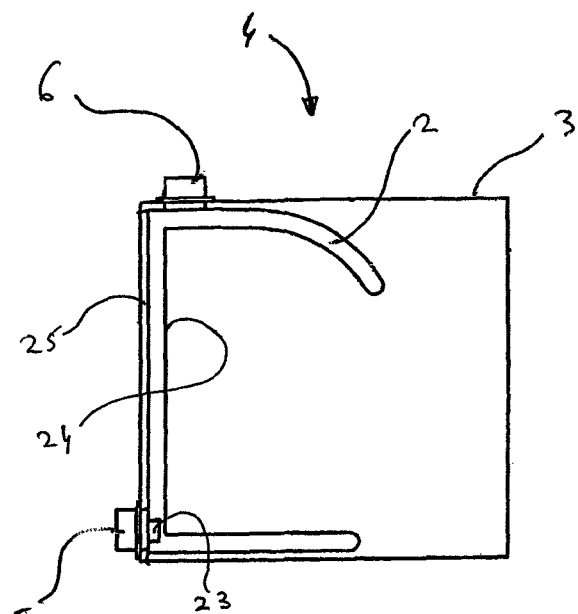
FIGS. 8a-c are very schematic sectional side views of a foldable bag in a box, illustrating an unfolding process of the bag during filling of the bag in an initial state (FIG. 8a), an intermediate state (FIG. 8b) and a final state (FIG. 8c).
Figure 8B:
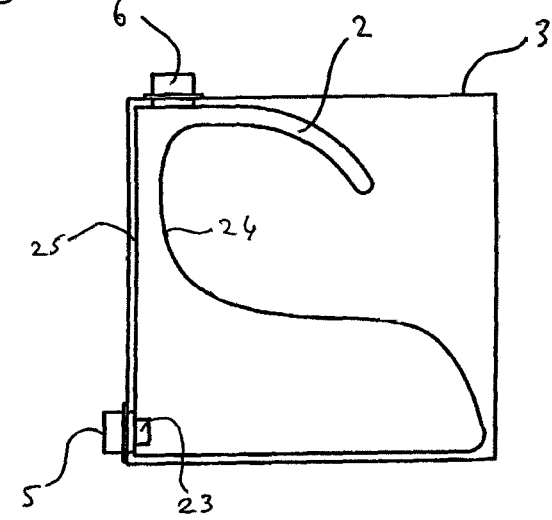
Figure 8C:
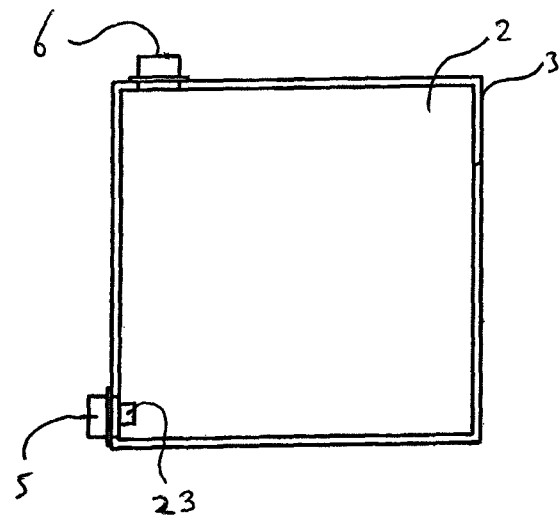

In FIGS. 8a-c the bag-in-box 4 principle is illustrated. FIG. 8a shows the initial state of the bag 2 when it is still empty. The bag 2 is fixed to the box 3 at a first valve 5 and a second valve 6. It is also possible that the bag-in-box 4 has only one valve 5, 6, for example only the first valve 5 for filling and emptying the bag 2. During filling of the bag 2 the bag 2 unfolds, such as shown in FIG. 8b. At the end of the filling process the bag 2 obtains the shape of the box 3 such as shown in FIG. 8c.

In practice the bag-in-box 4 is often used for storage of sterilized products, such as liquids for nutritional products. Before filling the bag 2 with a sterilized product the bag 2 as well as the valves 5, 6 must be disinfected. This can be done by irradiation of the empty bag 2 and the valves 5, 6 fixed thereto with gamma rays.

Before opening one of the valves 5, 6 in order to fill the bag 2, the valve 5, 6 is connected to a supply system (not shown) which will transfer the product through one of the valves 5, 6 into the bag 2. After connection, the upstream part of the valve 5, 6 is disinfected by exposing it to a hot fluid, such as steam, during a predetermined period. The hot fluid is provided via a side branch on a connecting pipe between the supply system and the valve 5, 6, for example. Thereafter, the bag 2 can be filled with the sterilized product. This means that the valve 5, 6 needs to have a good resistance against both high temperature and irradiation. Besides, the higher the allowable temperature the shorter the time period of disinfection may be before filling the bag 2. The valves 5, 6 may comprise the butterfly valve 1. Therefore, when the butterfly valve 1 is mentioned hereinafter, one be referred to the valves 5, 6, as well.

FIG. 1 shows that the embodiment of the butterfly valve 1 comprises a housing 7 which can be made of plastic by injection molding. The housing 7 is preferably made of a polycarbonate since this material has a good resistance against irradiation and high temperature for disinfecting such a valve 1. For example, polycarbonate degrades at a radiation level of more than 1000 kGray, whereas POM (PolyOxyMethylene), for example, already degrades above 15 kGray.

The butterfly valve 1 further comprises a lever 8 for opening and closing the valve 1. A first end portion 9 of the housing 7 is provided with an external thread on which a closure cap (not shown) can be screwed in the case when the butterfly valve 1 is not operated, for example, during transport of the bag 2 to which the butterfly valve 1 can be fixed. A second end portion 10 of the housing 7 protrudes into the bag 2.

FIG. 2 shows the inner side of the butterfly valve 1. The butterfly valve 1 comprises a passageway 11, of which the circumferential edge is defined by an internal surface 12 of the housing 7. In the embodiment of FIGS. 1-6 the passageway 11 has a circular cross-sectional area.

The butterfly valve 1 is provided with a valve plate member 13, which has a circular plate-like shape and which is fixed to a valve shaft 14. The valve shaft 14 is eccentrically positioned with respect to the valve plate member 13. The valve plate member 13 is enclosed by seal, in this case in the form of an elastic O-ring 15. FIG. 2 shows that in this embodiment a plane through the O-ring 15 extends perpendicular to a center line 16 of the passageway 11.

The valve shaft 14 has an axis of rotation which extends across the passageway 11 through the center line 16 and is rotatably mounted to the housing 7. The central position of the valve shaft 14 with respect to the center line 16 has the advantage that an internal or external pressure on the valve plate member 13 at one of both sides thereof results in an even force distribution on the valve plate member 13 with respect to the axis of rotation. Therefore, the external pressure will not generate an opening moment on the valve plate member 13. An end portion of the valve shaft 14 is fixed to the lever 8 so as to be able to rotate the valve plate member 13 through the valve shaft 14. The valve shaft 14 is supported by bearings 17 in the housing 7 at opposite sides of the passageway 11, see FIG. 3. The space between the valve shaft 14 and the housing 7 can be provided with sealings to prevent leakage of hot fluid via this space during disinfection, such as described hereinbefore.

In a closed position of the valve plate member 13 such as shown in FIG. 2 the O-ring 15 enclosing the valve plate member 13 is in engagement with a valve seat 18. In the embodiment shown in FIG. 2 the valve seat 18 forms a part of the internal surface 12 of the housing 7. The valve seat 18 extends in a plane perpendicular to the center line 16 of the passageway 11. The width of the valve seat may be determined by a contact surface between the O-ring 15 and the internal surface 12 of the housing 7. The valve shaft 14 has an axis of rotation spaced from the plane through the valve seat 18.

The passageway 11 of the butterfly valve 1 has an inlet 19 to be positioned within the container and an outlet 20. The inlet 19 is defined at the left side of the valve plate member 13 and the outlet 20 at the right side of the valve plate member 13 in FIG. 2.

Such as shown in FIG. 2 the valve shaft 14 is located eccentrically with respect to the valve plate member 13. This has the advantage that the O-ring 15 is not interrupted by a portion of the valve shaft 14, such as might be the case with a centrically positioned valve shaft 14. As a consequence the butterfly valve 1 offers a sealed closure of the passageway 11 and in the closed position of the valve plate member 13 there is no risk of leakage via sealings of the valve shaft 14 in the housing 7 which is a typical phenomenon of centrically positioned valve shafts 14. Furthermore, when the outlet 20 side of the passageway 11 is disinfected by a hot fluid, the fluid cannot reach the inlet 19 through sealings between the valve shaft 14 and the housing 7.

As a consequence of the eccentrically positioned valve shaft 14 its axis is spaced from the plane through the valve seat 18. Therefore, the center of the O-ring 15 moves away from the center line 16 of the passageway 11 when opening the butterfly valve 1. This means that in the open position the plane through the O-ring 15 intersects the internal surface 12 of the housing 7 to form a sectional area of the passageway 11 having a width close to and parallel to the axis of rotation of the valve shaft 14 which width is smaller than the initial outer diameter of the O-ring 15 in the closed position of the valve plate member 13. This can be seen in FIG. 6: it may be clear that if the circular passageway 11 had a uniform diameter over its length, the width of the passageway 11 in a plane through the O-ring 15 in the open position of the valve 1 would be smaller than the diameter of the passageway 11. As a consequence, the flexible O-ring 15 would be compressed in the area where it crosses the valve shaft 14. After filling the bag 2 and closing the butterfly valve 1 the compressed portion of the O-ring 15 will expand in order to form a sealing between the valve plate member 13 and the inner surface 12 of the housing 7. However, the expansion takes some time, especially in cold conditions, and may result in some leakage just after filling.

Figure 5:
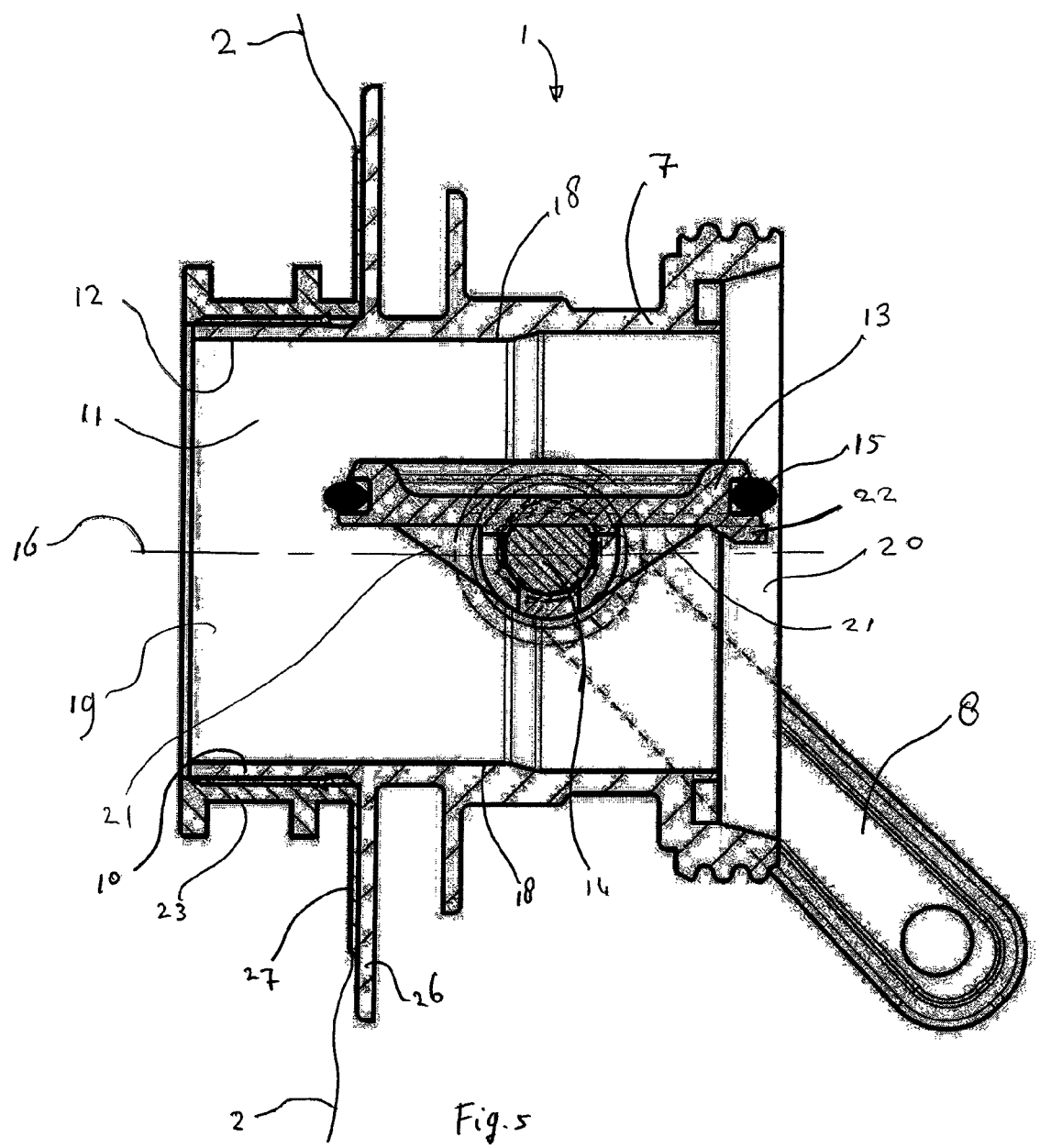
FIG. 5 is a sectional view along the line V-V in FIG. 4.
Figure 6:
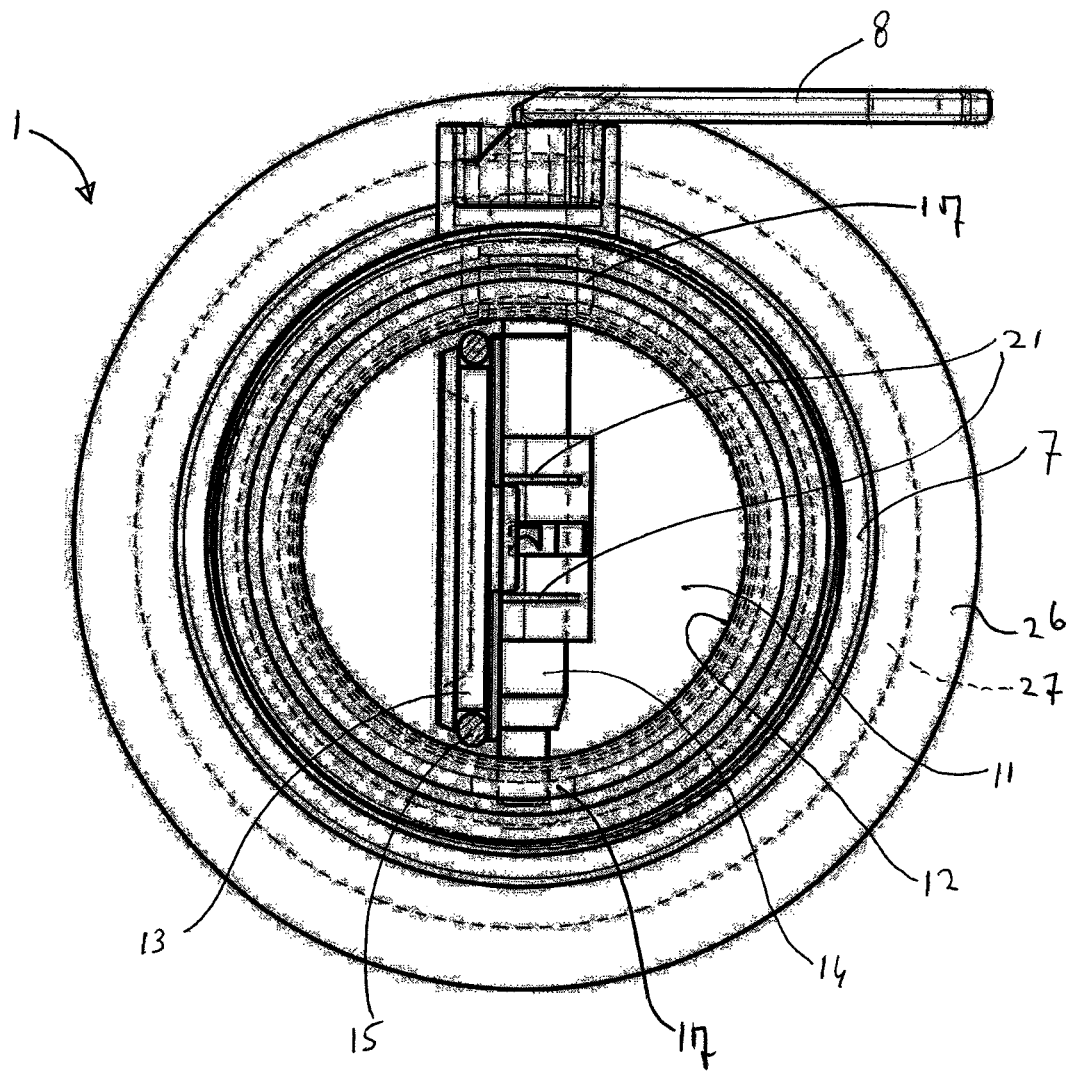
FIG. 6 is a front view of the butterfly valve of FIG. 4.

This is solved according to the invention, such as can be seen in the embodiment of FIG. 2, in which the cross-sectional area of the passageway 11 at the right side of the valve seat 18 is larger than the cross-sectional area at the valve seat 18. Due to the eccentrically positioned valve shaft 14 the valve plate member 13 is not only rotated into a narrower part of the passageway 11 when opened (such as described above), but it is also moved away from the plane through the valve seat 18 in the direction of the axis of rotation of the valve shaft 14. Thus, in the open position the biggest circumferential part of the O-ring 15 is located beyond the valve seat 18 as viewed from the valve seat 18 in the direction of the valve shaft 14, such as shown in FIG. 5. As the cross-sectional area of the passageway 11 in the embodiment of FIG. 5 at the side of the valve seat 18 facing the outlet 20 is larger than at the valve seat 18, the biggest part of the O-ring 15, and in particular the area where it crosses the valve shaft 14, has more room in the opened position than in the case of a uniform diameter in axial direction of the passageway 11. As a consequence, the O-ring 15 is deformed less in the open position of the valve plate member 13 such that in its closed position the risk of leakage is minimized.

It can be seen in FIG. 2 that in this embodiment the diameter of the passageway 11 increases gradually beyond the valve seat 18 as viewed from the valve seat 18 in the direction of the valve shaft 14. This avoids a high local pressure on the O-ring 15 compared to the case of a sudden diameter transition.

FIG. 2 also shows that the valve plate member 13 has a decreasing diameter in the direction of the inlet 20. Due to this shape the circumferential edge of the valve plate member 13 does not contact the housing in the open position of the valve plate member 13.

The valve plate member 13 of the embodiment of the butterfly valve 1 shown in FIGS. 1-6 is provided with reinforcement ribs 21 which are located at the side of the valve plate member 13 facing the outlet 20 of the passageway 11. The reinforcement ribs 21 are clearly shown in FIG. 3. The ribs 21 can be integrally molded together with the valve plate member 13 and serve to minimize bending of the valve plate member 13 in the case of disinfecting the outlet 20 of the passageway 11 with a hot fluid under high pressure, which presses against the valve plate member 13 at the inlet side 19, for example at a pressure of 4 bar.

The valve plate member 13 of the embodiment of the butterfly valve 1 shown in FIGS. 1-6 is also provided with a stop mechanism in the form of a projection 22. The projection 22 is mounted on the valve plate member 13 and projects beyond the circular outer edge of the valve plate member 13, such as can be seen in FIGS. 2 and 3. In this embodiment the projection 22 is shaped such that it is in engagement with the internal surface 12 of the housing 7 at the right side of the valve seat in FIG. 2. As the cross-sectional area at the right side of the valve seat 18 is larger than at the valve seat 18 the projection 22 prevents the valve plate member 13 from rotating further in anti-clockwise direction when closing the butterfly valve 1 than the closed position such as shown in FIG. 2.

The valve plate member 13 can be made of polyamide and the valve shaft 14 of fibre-reinforced polyamide. This material has a high-temperature and irradiation resistance. It is also possible to make the valve shaft 14 and the valve plate member 13 of polycarbonate. The advantage of using polycarbonate is that it is less hydroscopic than polyamide which means that it swells less when it is used in an aqueous environment.

FIG. 2 shows the way in which the bag 2 is fixed to the butterfly valve 1. A sleeve 23, which is preferably made of polyethylene is fixed to the bag 2, which is also preferably made of polyethylene, by heat-welding, for example. The housing 7 of the butterfly valve 1 is fixed to the sleeve 23 by pressing the housing 7 into the sleeve 23, such that the inner cylindrical wall of the sleeve 23 is fixed to the outer cylindrical wall of the housing 7.

It is preferred that the sleeve 23 protrudes into the bag 2, such as shown in FIG. 8. When the bag 2 is emptied and it folds to its original folded state, for example, a movable wall part 24 of the bag 2 may glide downwards along an opposite wall 25 of the bag 2 which is fixed to the box 3. As the sleeve 23 protrudes in the bag 2 the downwardly sliding wall part 24 will not stick to the bag wall part surrounding the valve 1 and thereby close-off the inlet 19 of the valve 1, such that further emptying of the bag 2 would be impossible. A similar close-off effect is avoided in the case when the opposite wall 25 is not fixed to the box. An upper portion of the wall 25 may stick to and glide downwardly along a lower portion of the wall 25 during emptying the bag. Because of the protruding sleeve 32 the gliding wall 25 will not stick to the wall portion surrounding the valve 1.

In FIG. 1 it can be seen that the housing 7 of the butterfly valve 1 is provided with a flange 26. The flange 26 faces an outer side of the bag 2, but it is not fixed to a flange 27 which may be part of the sleeve 23 and which faces the flange 26 of the housing 7 when the housing 7 and the sleeve 23 are in mounted condition.

Preferably, the flange 27 of the sleeve 23 has a smaller diameter than the flange 26 of the housing 7, see FIGS. 1-7. If the diameter of the flange 27 of the sleeve 23 was larger than that of the flange 26 of the housing 7, this would probably lead to cutting of the bag 2 near the edge of the flange 27 of the sleeve when the valve 1 is positioned in the bag-in-box 4 combination such that the flange 27 of the sleeve 23 contacts a bottom of the box 3. In that case, as the bag wall 25 in FIG. 8 lies between the bottom of the box and the flange 27 of the sleeve 23, the bag wall 25 might be cut by the flange 27 of the sleeve 23 during vibrations of the box 3, for example. Since the diameter of the flange 26 is larger than that of the sleeve 23 this problem does not occur. It should be noted that in the state-of-the-art the flange 27 of the sleeve 23 is secured to the bag wall by positioning the flange 27 against the bag wall from the inner side of the bag and heat-welding them together by using a heat-welding tool from the outer side of the bag 2, such that the bag wall is disposed between the flange 27 and the bottom of the box 3 in the bag-in-box configuration of FIG. 8.

Figure 7:
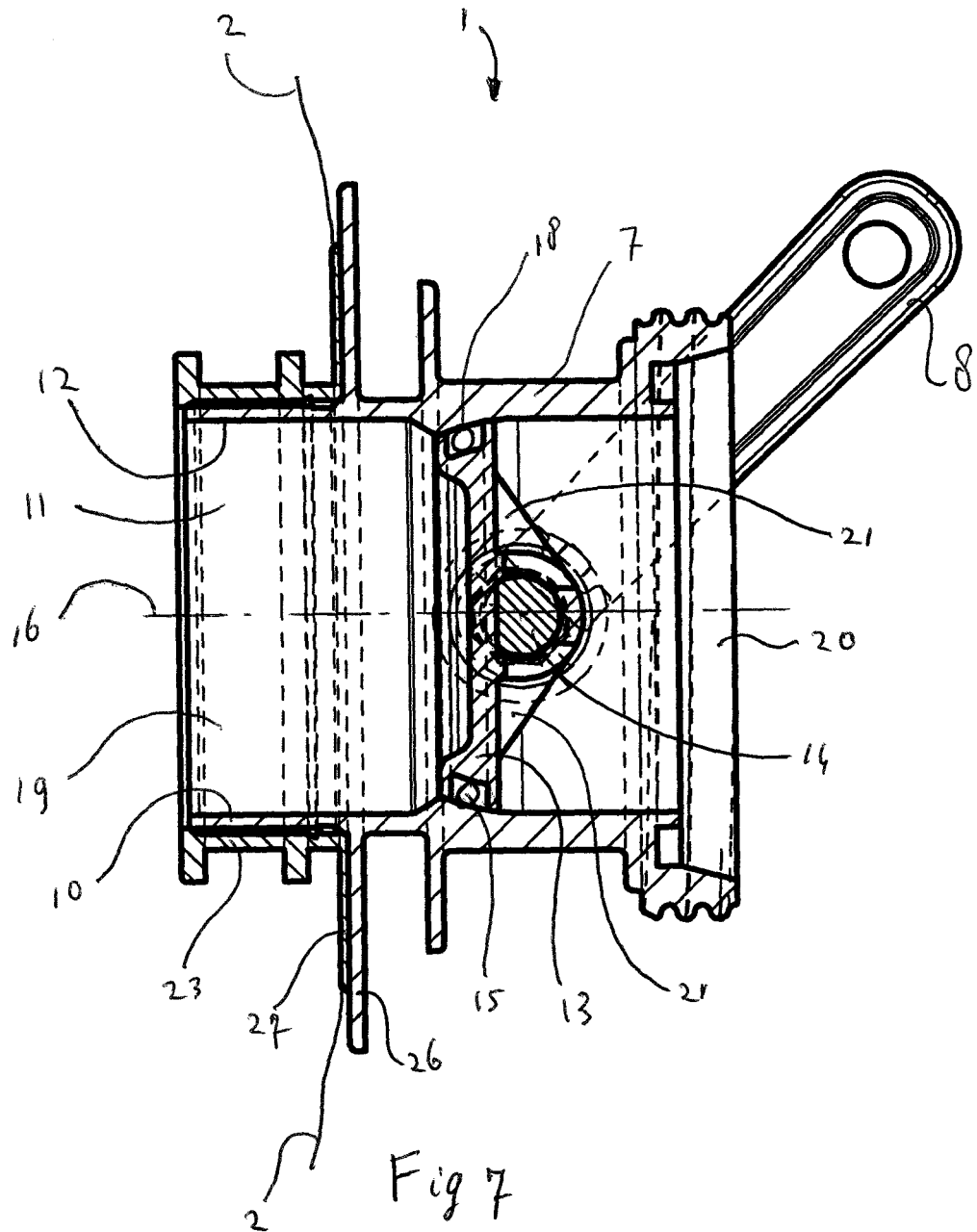
FIG. 7 is a sectional view of an alternative embodiment of the butterfly valve according to the invention.

FIG. 7 shows an alternative embodiment of the butterfly valve 1. In this embodiment the valve seat 18 has a decreasing cross-sectional area as viewed from the outlet 20 to the inlet 19, i.e. a conical shape. Also in this embodiment the cross-sectional area of the passageway 11 at the outlet side 20 of the valve seat 18 is larger than the cross-sectional area at the valve seat 18, which means larger than the widest portion of the varying cross-sectional area of the valve seat 18 in this case. The advantage of this configuration of the valve seat 18 is that the space between the edge of the valve plate member 13 and the housing 7 at the inlet side 19 is decreased, which reduces the risk of blowing out the O-ring 15 from the valve plate member 13 in the case when a fluid under high pressure is present at the outlet side 20 during disinfecting of the valve 1, for example. Furthermore, when a high pressure is present at the outlet side 20, the valve plate member will be pressed against the conically-shaped valve seat 18. This means that the force exerted on the valve shaft 14 is decreased such that it can be made of a light material. Besides, the reinforcement ribs 21 may be eliminated, as well.

Several dimensions of the shown embodiment of the butterfly valve 1 are generally interrelated and should preferably be chosen carefully. For example, the allowable inclination angle of the valve seat 18 in FIG. 7 depends on the ratio of the radial distance from the center line 16 to the circumferential edge of the valve plate member 13 and the axial distance from the axis of rotation to the plane through the O-ring 15. This inclination angle may generally not exceed the allowable value so as to avoid difficult opening of the valve plate member 13.

From the foregoing it will be clear that the invention provides a butterfly valve which has such a configuration that leakage via the seal in the closed position is avoided, because of minimal deformation of the seal in the open position. The butterfly valve has a good resistance against high temperature and irradiation. The invention also provides a container and valve assembly which comprises such a butterfly valve. Due to the features of the housing of the butterfly valve the container can be efficiently emptied. Furthermore, the invention provides a manufacturing method of securing a valve to a container by pressing the housing of the valve into a sleeve which is fixed in a hole of the container. This facilitates manufacturing of the container and valve assembly.

The invention is not restricted to the above-described embodiment as shown in the drawings. It may be apparent that various changes can be made in the embodiment without departing from the scope of the claims. For example, it is possible that the passageway has an oval or other shape instead of a circular one. Furthermore, a stopping mechanism may also be located between the lever and the housing so as to prevent the valve plate member from rotating further after arriving in the closed position when the valve is closed. The housing of the butterfly valve may also be fixed to the container in another way such as by gluing or heat-welding or alternative fixing methods.

The invention claimed is:
1. A container for containing fluid comprising;
 a butterfly valve comprising:
  a housing including a passageway defined by an internal surface of the housing, said passageway having a center line in axial direction thereof, a valve seat enclosing the passageway, the valve seat defining a plane, a valve shaft rotatably mounted to the housing and having an axis of rotation extending through the center line and spaced apart from the plane that extends through the valve seat, a valve plate member fixed to the valve shaft and being located in the passageway, a seal enclosing the valve plate member, said valve plate member having an open position and a closed position, in which the seal is in engagement with the valve seat so as to close the passageway, wherein at least in a plane through the seal in the open position, the width of the passageway adjacent to the valve seat as viewed from the valve seat in the direction of the axis of rotation is larger than the width of the passageway at the valve seat, a bag secured to the housing of the butterfly valve at a location thereof spaced from an end of the housing which protrudes in the bag, wherein the housing and bag are each made of plastic suitable for disinfecting by irradiation and high temperature with the bag secured to the end of the housing; and wherein the housing of the butterfly valve comprises a flange located on an external surface portion thereof, spaced apart from the valve seat in a direction opposite the direction of the axis of rotation, the bag further including a sleeve having a flange sealingly secured to an inner surface of the bag, so that the sleeve protrudes into the bag, with the housing extending into and being sealingly coupled within the sleeve, so that the bag is sandwiched between the flange mounted to the inner surface of the bag to which the bag is sealingly coupled and the flange of the housing of the butterfly valve along which the bag is abuttingly positioned, wherein the flange of the housing of the butterfly valve is larger than the flange of the sleeve, the container further comprising a box wherein the butterfly valve is mounted to an opening in the box with the flange of the housing of the butterfly valve being positioned within the box with at least a portion of the housing extending outside of the box.

2. The container according to claim 1, wherein the cross-sectional area of the passageway has a circumferential edge, which circumferential edge adjacent to the valve seat as viewed from the valve seat in the direction of the axis of rotation of the valve shaft extends beyond the circumferential edge at the valve seat in radial direction thereof.

3. The container according to claim 1, wherein the cross-sectional area of the passageway beyond the valve seat as viewed from the valve seat in the direction of the axis of rotation of the valve shaft gradually increases.

4. The container according to claim 1, wherein the passageway has a circular cross-sectional area.

5. The container according to claim 1, wherein the cross-sectional area of the passageway at least at the valve seat decreases in axial direction of the passageway.

6. The container according to claim 5, wherein the cross-sectional area of the passageway decreases up to an axial location of the passageway adjacent to an end portion of the valve plate member in its closed position, which end portion is located on the valve plate member in a direction as viewed from the axis of rotation to the seal.

7. The container according to claim 1, wherein the passageway comprises an inlet at one side and an outlet at an opposite side of the valve plate member, and the valve plate member is provided with reinforcement ribs located at a side of the valve plate member facing the outlet.

8. The container according to claim 7, wherein the reinforcement ribs are located next to the valve shaft as viewed from the plane through the seal in a direction perpendicular thereto.

9. The container according to claim 1, wherein the butterfly valve comprises a stop mechanism for stopping the valve plate member with respect to the housing when it is rotated from its open position to its closed position.

10. The container according to claim 9, wherein the stop mechanism comprises a projection mounted to the valve plate member which projects beyond the circumference of the valve plate member in a radial direction of the plane through the seal substantially perpendicular to the axis of rotation.

11. The container according to claim 1, wherein the housing is made of polycarbonate.

12. The container according to claim 1, wherein the valve plate member is made of polyamide, and the valve shaft is made of fibre-reinforced polyamide.

13. The container according to claim 1, wherein the valve plate member and/or the valve shaft are made of polycarbonate.

14. The container according to claim 1 and further comprising a box, wherein the butterfly valve and the box are mounted to each other with the bag disposed in the box such that the bag is filled and/or emptied with liquid material by opening the butterfly valve.

15. The container according to claim 14, wherein the bag is configured such that it folds when it is emptied.

16. The container according to claim 1, wherein the housing of the butterfly valve comprises a flange located on an external surface portion thereof, and the external surface portion is fixed to a sleeve which is mounted to a box in a hole of the box wherein the flange faces an external wall of the box.

17. The container according to claim 16, wherein the sleeve includes a flange opposite to the flange of the housing, said flange of the housing having a circumferential edge which extends at least partly beyond a circumferential edge of the flange of the sleeve as viewed from the center line.

18. The container of claim 1 wherein the bag is secured to the end of the housing with a heat weld between the plastic material of the bag and the plastic material of the housing.

19. The container of claim 18 wherein the housing includes a plastic sleeve at the end of the housing forming an outer surface to which the bag is secured, the sleeve having the heat weld with the bag.

20. The container of claim 19 wherein a portion of the housing having an internal surface at the end has a corresponding outer surface about the center line at the end that is secured to the sleeve with a press fit connection.

* * * * *